(12) United States Patent
Schmidt et al.

(10) Patent No.: US 10,474,187 B2
(45) Date of Patent: Nov. 12, 2019

(54) GLARE REDUCTION HOOD FOR A TOUCHSCREEN DISPLAY

(71) Applicant: Hoodman Corporation, Torrance, CA (US)

(72) Inventors: Louis J. Schmidt, San Pedro, CA (US); Michael R. Schmidt, Hermosa Beach, CA (US); Robert P. Schmidt, West Hollywood, CA (US)

(73) Assignee: Hoodman Corporation, Torrance, CA (US)

(*) Notice: Subject to any disclaimer, the term of this patent is extended or adjusted under 35 U.S.C. 154(b) by 107 days.

(21) Appl. No.: 15/708,224

(22) Filed: Sep. 19, 2017

(65) Prior Publication Data

US 2018/0004249 A1 Jan. 4, 2018

Related U.S. Application Data

(62) Division of application No. 13/941,610, filed on Jul. 15, 2013, now Pat. No. 9,891,661.

(60) Provisional application No. 61/808,708, filed on Apr. 5, 2013.

(51) Int. Cl.
*G02B 27/00* (2006.01)
*G06F 1/16* (2006.01)

(52) U.S. Cl.
CPC .......... *G06F 1/1603* (2013.01); *G02B 27/00* (2013.01)

(58) Field of Classification Search
CPC ...... H04N 5/54; G02B 27/00; G02B 27/0018; G03B 11/04; G03B 11/048; G03B 17/12; G06F 1/1603
USPC ............. 361/679.03, 679.21, 679.26–379.3, 361/679.55–679.56, 834–842; 345/905
See application file for complete search history.

(56) References Cited

U.S. PATENT DOCUMENTS

| 7,611,252 B1 | 11/2009 | Lin |
| 2002/0089754 A1 | 7/2002 | Dion |
| 2014/0046193 A1 | 2/2014 | Stack |

*Primary Examiner* — Marin Pichler
(74) *Attorney, Agent, or Firm* — Fildes & Outland, P.C.

(57) ABSTRACT

A glare reduction hood for a touchscreen display includes an elongated closure structure having an open mounting end and an opposite, open viewing end. The mounting end is mountable on the touchscreen display such that the hood projects outwardly from the touchscreen display. The elongated closure structure includes a pierceable panel disposed between the mounting and viewing ends and having an openable and predisposably closed access. The closure structure shields the touchscreen display, the access is pierceable by a piercing object and intimately fitable around the piercing object preventing light from passing through the access, and the touchscreen display is viewable through the viewing end and contactable via the access.

5 Claims, 6 Drawing Sheets

GLARE REDUCTION HOOD FOR A TOUCHSCREEN DISPLAY

CROSS-REFERENCE TO RELATED APPLICATIONS

This application is a division of U.S. application Ser. No. 13/941,610 filed Jul. 15, 2013, which claims the priority of U.S. Provisional Application No. 61/808,708 filed Apr. 5, 2013.

TECHNICAL FIELD

This invention relates to glare reduction devices for touchscreen displays, and more particularly to a glare reduction device that is attachable to a touchscreen display to reduce and/or eliminate glare on the touchscreen while also providing a user with access to the touchscreen for manipulation of objects and controls displayed on the touchscreen.

BACKGROUND OF THE INVENTION

It is known in the art relating to displays such as televisions, video monitors, LCD screens, and the like to provide a glare reduction device to reduce and/or prevent glare on the display created by ambient light. Glare from ambient light, such as artificial indoor lighting and especially sunlight in an outdoor environment, makes it difficult to properly view a display screen. It is necessary to preclude as much of this light as possible from reaching the screen so that viewing of the screen is improved.

Touchscreen displays, which allow a user to interact directly with what is displayed on the screen by using one or more fingers or a handheld object such as a stylus, have become increasingly more common in electronic devices. However, conventional glare reduction hoods, while shielding a touchscreen display from ambient light, block all sides of the display, making it difficult and cumbersome to utilize the touch functions provided by the display.

SUMMARY OF THE INVENTION

The present invention provides a glare reduction hood that allows a user to have easy access to a touchscreen display while also providing continuous glare reduction during both touching of the display and viewing when not touching the display. The hood is made of a closure structure that is mountable on and about a touchscreen display. The closure structure shields the display from ambient light to provide a shaded viewing area and is also pierceable by a hand or other object.

More particularly, in one embodiment a glare reduction hood in accordance with the present invention includes an elongated closure structure having an open mounting end and an opposite, open viewing end. The mounting end includes an attacher for attaching and securing the hood to a touchscreen display. The elongated closure structure includes a pierceable panel disposed between the mounting and viewing ends and having an openable and predisposably closed access. The closure structure shields the touchscreen display, the access is pierceable by a piercing object and intimately fitable around the piercing object so that light is unlikely to be transmitted through the access, and the touchscreen display is viewable through the viewing end and contactable (touchable) via the access.

In a specific embodiment, the access is an expandable, conformable and returnably collapsible opening. The opening is generally transverse to an axis of the elongated closure structure, and the opening is generally linear and extends across the width of the pierceable panel. The closure structure includes two or more connected panels, and one of these panels is the pierceable panel.

At least one frame member provides support for the closure structure. One of the frame members may extend longitudinally from the viewing end to the mounting end. Another one of the frame members may be a curved member disposed along an edge of the viewing end.

The closure structure has a cross-sectional shape that generally corresponds to the cross-sectional shape of the touchscreen display, and the viewing end defines a viewing end opening through which the touchscreen display can be viewed.

In another embodiment, a glare reduction hood for a touchscreen display in accordance with the present invention includes an elongated, hollow closure structure having a mounting end including a mounting end opening, an opposite viewing end including a viewing end opening, and a sidewall extending between the mounting end and the viewing end. The mounting end includes an attacher for attaching and securing the hood to a touchscreen display. The sidewall includes a pierceable panel having an openable and predisposably closed access slit therein. The slit expands upon insertion of an object through the pierceable panel, the slit intimately conforms around the piercing object so that light is unlikely to be transmitted through the slit, and the slit elastically returns to its resting position upon removal of the object.

Optionally, a strip of elastic material is disposed along each opposing edge of the slit. The strips of elastic material may overlap. The pierceable panel may be a bottom panel of the sidewall. The sidewall may include two or more connected panels, one of these being the pierceable panel. The access slit may be generally linear and may extend generally transversely across the width of the pierceable panel. At least one frame member may be mounted on the sidewall to provide support for the closure structure.

A method of reducing glare on a touchscreen display while providing access to the touchscreen display includes the steps of: providing an elongated closure structure having a mounting end and an opposite viewing end, the elongated closure structure including a pierceable panel disposed between the mounting and viewing ends and having an openable and predisposably closed access therein that is intimately fitable around a piercing object so that light is unlikely to be transmitted through the access; disposing an attacher on the mounting end; and attaching and securing the hood to a touchscreen display with the attacher.

The access may be an expandable, conformable and returnably collapsible opening. The method may further include the step of disposing at least one frame member on the closure structure for providing support.

These and other features and advantages of the invention will be more fully understood from the following detailed description of the invention taken together with the accompanying drawings.

DETAILED DESCRIPTION OF THE INVENTION

Figure 1:
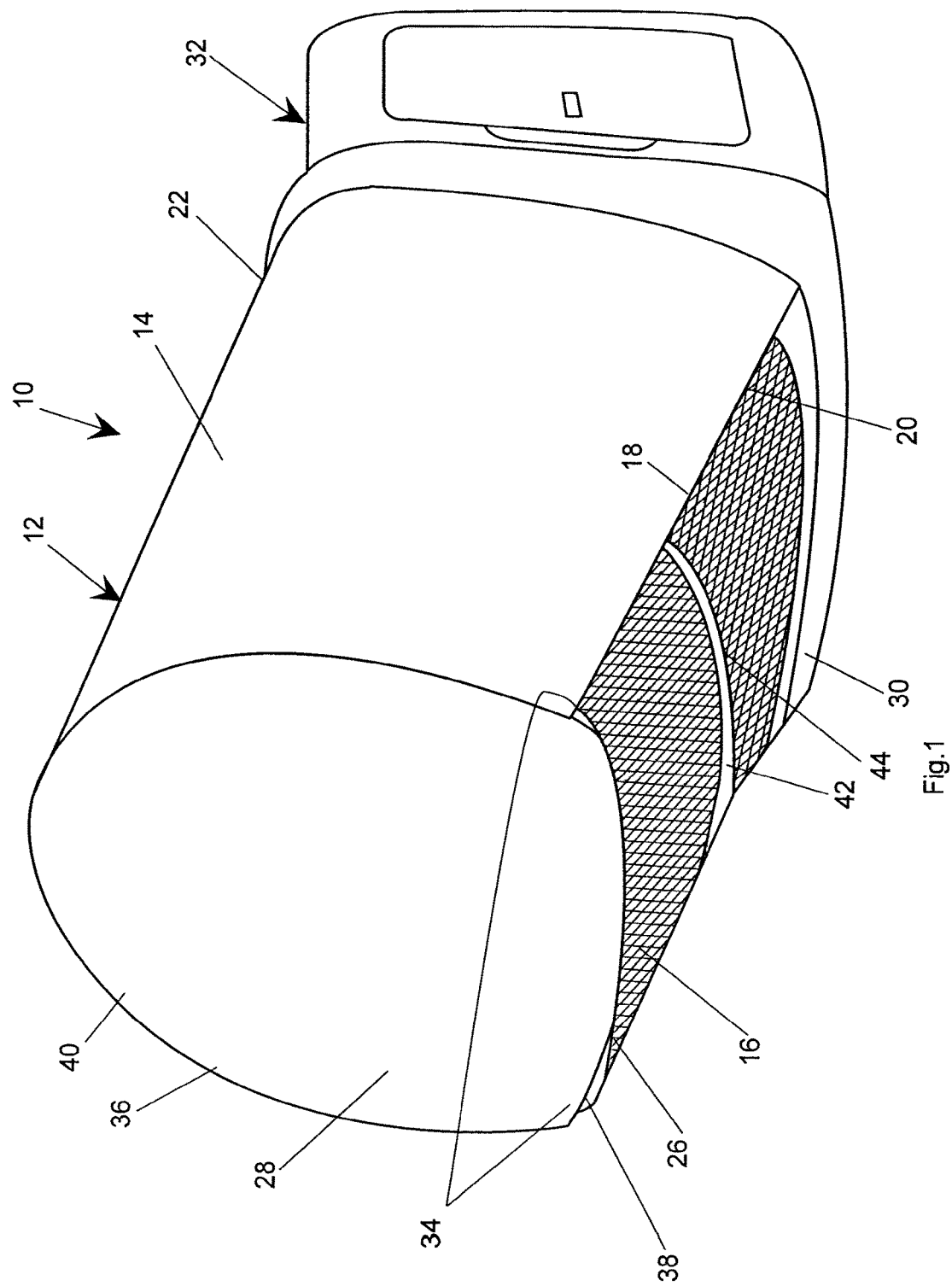
FIG. 1 is a perspective view of a glare reduction hood in accordance with an embodiment of the present invention mounted on a touchscreen display.

Referring now to the drawings in detail, numeral 10 generally indicates a glare reduction hood in accordance with the invention. The glare reduction hood 10 provides easy hand/finger/stylus access to a touchscreen display while at the same time shielding the touchscreen display from ambient light. The glare reduction hood 10 is especially useful for outdoor viewing and use of a touchscreen display, and also allows for improved viewing in indoor environments where glare from ambient lighting is an issue.

Figure 2:
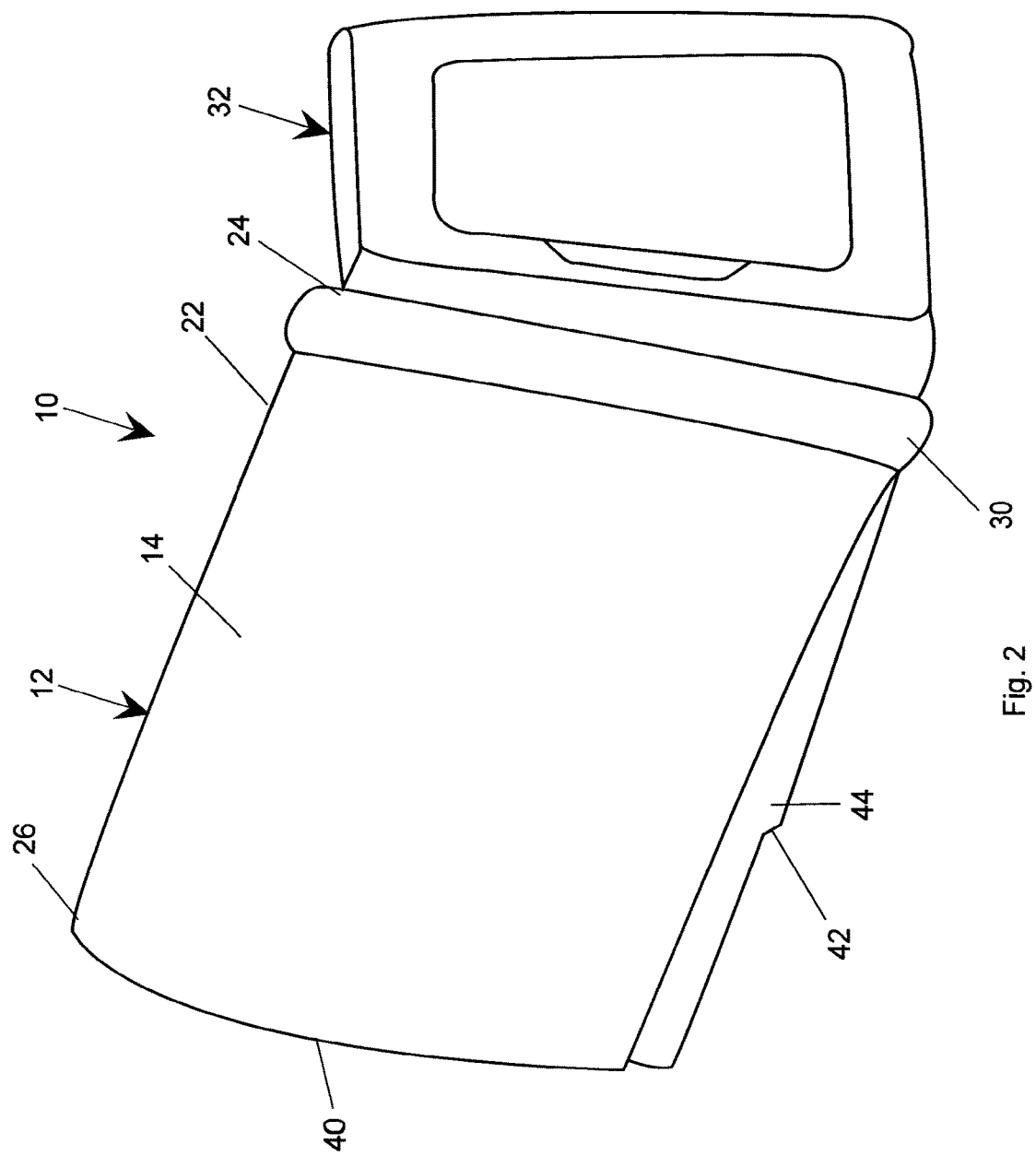
FIG. 2 is a side view of the glare reduction hood.

With reference to FIGS. 1 and 2, in one embodiment the glare reduction hood 10 includes an elongated closure structure 12 that is generally hollow and has a tubular or tubular-like shape. The closure structure 12 is defined by an endless sidewall formed of at least two panels 14, 16 that are edge-connected (sewn together) along adjacent edges 18, 20. However, it should be understood that the closure structure may be made from a single piece of material that is formed (e.g., cut and/or sewn) to have distinct panel sections. The sidewall is made of a flexible, opaque fabric material such as, but not limited to, a nylon or polyester material that is both durable and lightweight. An inside surface of the sidewall of the closure structure 12 is preferably a light absorbing color which is most preferably black. The closure structure 12 has a mounting end 22 defining a mounting end opening 24, and an opposite viewing end 26 spaced from the mounting end and defining a viewing end opening 28. The sidewall extends between the mounting and viewing ends to form an enclosed passageway through which an image can be viewed.

The mounting end 22 includes an attacher 30 such as cooperating strips of a hook-and-loop material (e.g. VELCRO®) or similar fastener for attaching and securing the hood to a touchscreen display 32. The touchscreen display may be, but is not limited to, a display for a computer, a tablet, a game console, a navigation device, a network terminal, a video device, a kiosk, a medical device, an industrial machine, or any other electronic device which is controlled via a display screen. The hood 10 is mounted on the touchscreen display 32 by placing the mounting end 22 over, around, and/or about the edges of the frame of the display whereby the hood projects outwardly from the front of the display and encloses all sides of the display. The hook-and-loop fastener 30 is stretched around the edges of the touchscreen display 32 to secure the hood 10 about the touchscreen. The touchscreen display 32 is thereby positioned in the mounting end opening 24 and is viewable by a user through the viewing end opening 28.

Frame members 34, 36 provide the closure structure 12 with rigidity and support. The frame members 34, 36 may be a made of a flexible metallic material, a flexible strip of polymeric material, or other similar flexible or semi-rigid support material. The frame members 34, 36 are disposed within the closure structure 12, such as within a hemmed edge 38 and hemmed edges 40 of panel 14 the closure structure 12. The frame members 34 extend longitudinally from the mounting end 22 to the viewing end 26 to strengthen the closure structure 12 in a depth direction extending away from the touchscreen display 32. Frame member 36 is a curved member disposed along the hemmed edge 40 of the viewing end 26 that holds open the viewing end opening 28 and provides the viewing end opening with a semi-arcuate shape similar to a mailbox opening. The closure structure 12, however, is not limited to any particular shape, and may have a square or rectangular shape rather than an arcuate or semi-arcuate shape. The closure structure 12 simply should have a cross-sectional shape that generally corresponds to the cross-sectional shape (i.e., the height and width) of the touchscreen display 32, and a longitudinal length (i.e., depth) that is sufficient to obstruct light rays that enter the enclosure formed by the closure structure from contacting and reflecting off the touchscreen display. The closure structure also may optionally include a frame member such as a bow or similar disposed intermediate the mounting and viewing ends and generally extending perpendicular to the longitudinal direction of closure structure.

The panel 16 of the endless sidewall is a pierceable panel. In this case, the pierceable panel is the bottom panel. However, the closure structure alternatively or additionally may include a pierceable side and/or top panel. The pierceable panel 16 is generally flat, but alternatively may have a curved shape. The pierceable panel 16 includes an openable and predisposably closed access such as, but not limited to, a transverse opening 42 (extending generally perpendicular to the longitudinal, depth direction of the closure structure) that is expandable and elastic. In this embodiment, the opening 42 is a generally linear slit that extends across the entire width of the panel 42. However, the opening may have other shapes (e.g., arcuate, sinusoidal, zigzag), may not extend across the entire width of the panel, and may be disposed at an angle (other than 90 degrees) relative to the longitudinal axis of the closure structure 12. The opening 42 is disposed generally horizontally, but alternatively may be disposed generally vertically, depending on the orientation of the panel in which it is disposed. The opening may be formed by cutting the fabric material of the pierceable panel. Alternatively, the pierceable panel may include two separate portions that are disposed next to each other, wherein the opening is formed between the adjacent, overlapping edges of the two portions.

Figure 3:
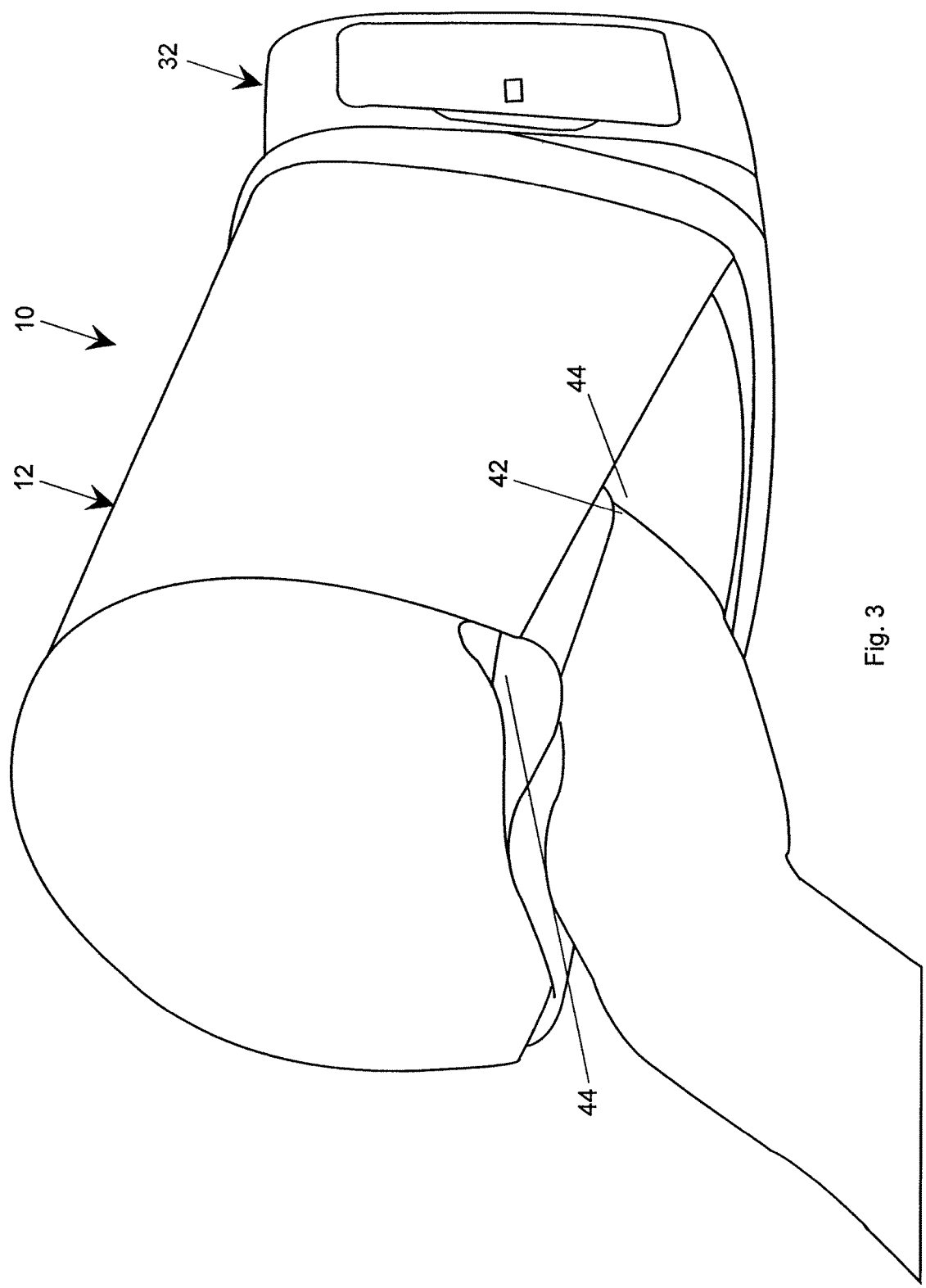
FIG. 3 is a perspective view of the glare reduction hood illustrating a user's hand piercing a panel of the hood to access the touchscreen display.
Figure 4:
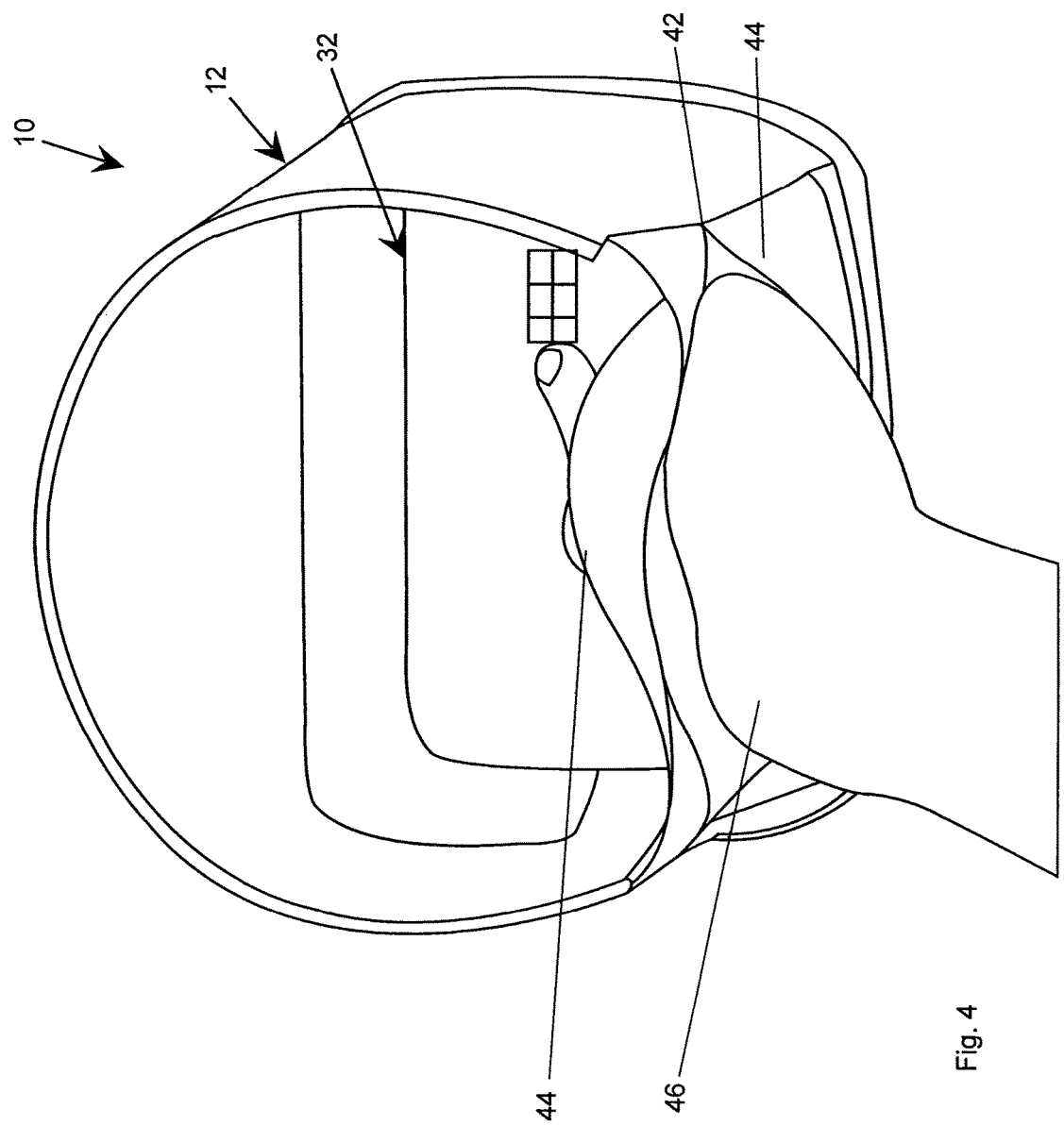
FIG. 4 is a rear view of the glare reduction hood illustrating a user's hand piercing a panel of the hood to access the touchscreen display.
Figure 5:
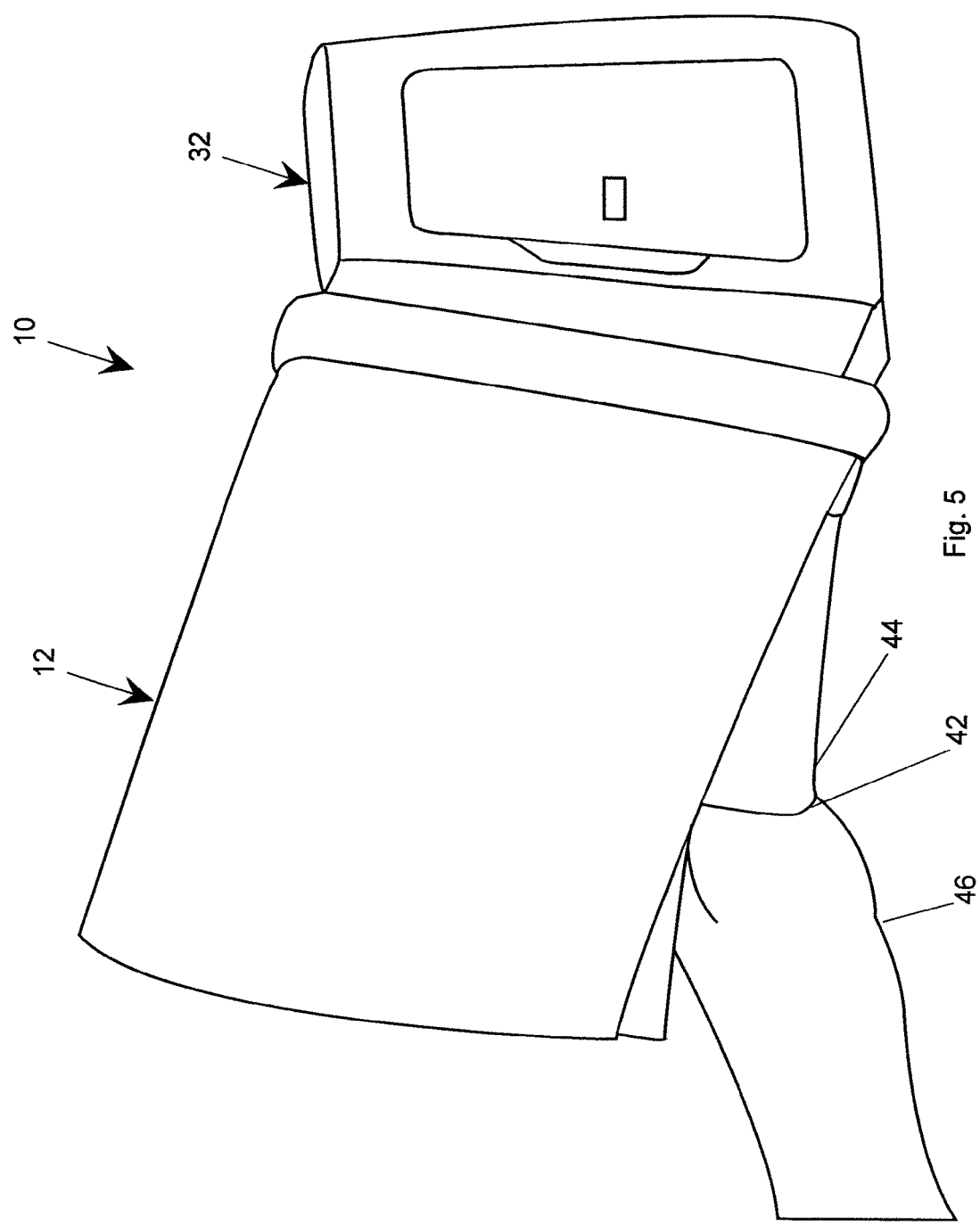
FIG. 5 is a side view of the glare reduction hood illustrating a user's hand piercing a panel of the hood to access the touchscreen display.

In one embodiment, a strip of elastic memory material such as an elastic band 44 or other similar strip of elastic material is attached (e.g., sewn) along each of the opposing edges of the opening 42. The elastic bands 44 may partially or fully overlap in the longitudinal direction. The memory property of the elastic bands 44 allow the opening 42 to open/expand when engaged with a hand or other object and to automatically return to a closed disposition when the hand or object is removed. In a resting position (FIGS. 1 and 2), the elastic bands 44 hold the opening 42 closed to seal the pierceable panel 16 and to prevent the passage of light through the panel. As shown in FIGS. 3 through 5, when a user desires to contact the touchscreen display 32, the user's hand 46 and/or a handheld stylus or other input device may be inserted through the opening 42. The elastic bands 44 intimately conform to the hand 46 and/or inserted object in this stretched position to generally seal around the pierce point, providing continuous glare reduction by preventing light from passing through the opening 42. When the hand 46 and/or object is withdrawn from within the hood, the elastic bands 43 automatically return to the resting position to reform a closed glare reducing panel.

Alternatively, the pierceable panel may be formed of an elastic memory material or similar such that the opening is predisposed in a closed disposition, openable when pierced by an object, conformable and intimately fitted around the piercing object so that light is unlikely to be transmitted through the piercable opening, and returnably collapsible back to the closed disposition upon removal of the piercing object.

The opening 42 is positioned a distance away from the mounting end opening 24 such that when a hand or object is inserted through the opening 42, it is far enough away from the surface of the touchscreen display to be easily moved about the screen but close enough to the screen to be able to touch the screen without reaching or stretching.

Figure 6:
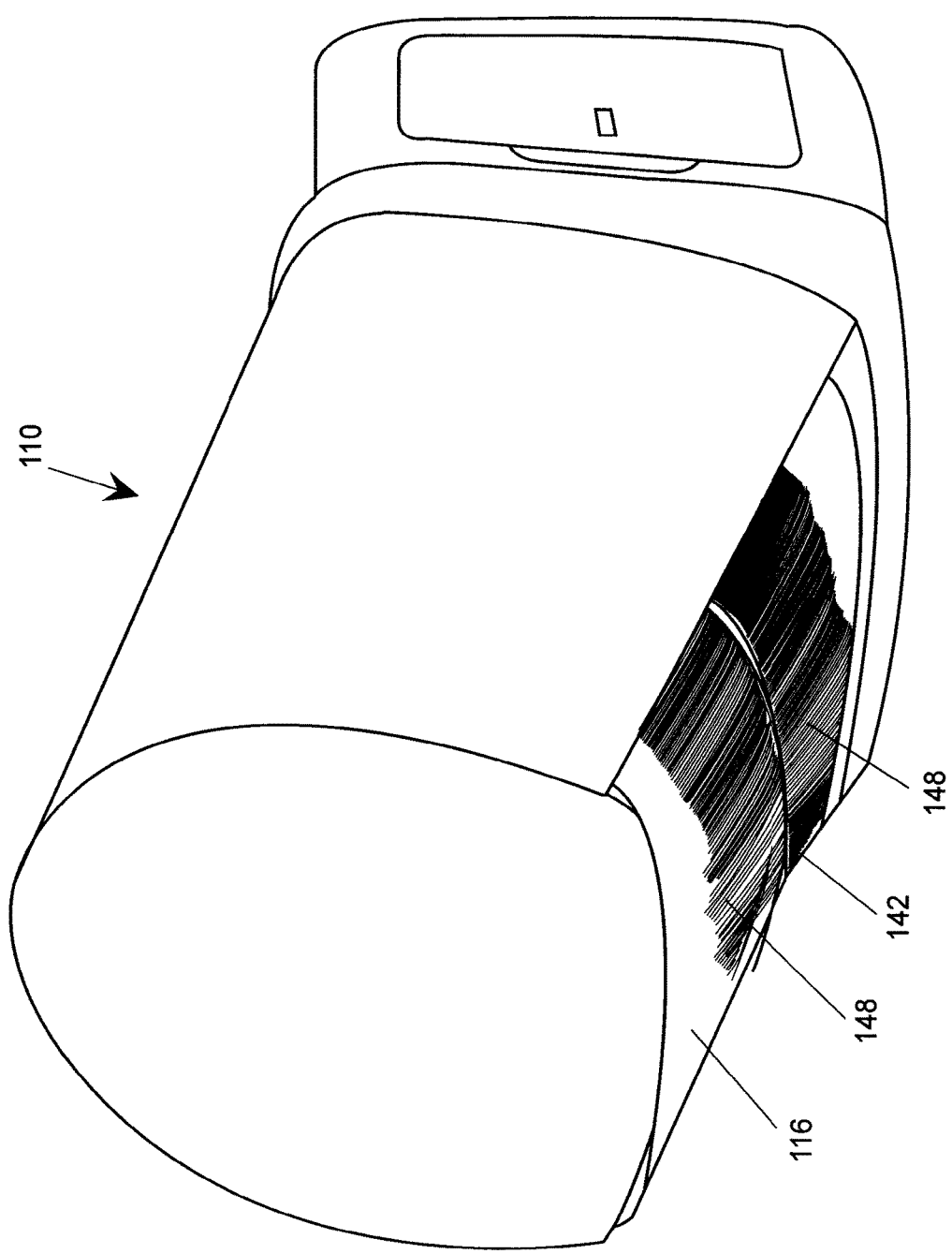
FIG. 6 is a perspective view of an alternative embodiment of a glare reduction hood.

In another embodiment 110 shown in FIG. 6, the access opening 142 of the pierceable panel 116 includes a row of bristles 148 or a pair of opposing rows of bristles extending from edge(s) of the opening 142. Ends of the opposing rows of bristles generally contact or partially overlap each other to shield light from passing through the pierceable panel 116. The opening 142 is pierced by inserting an object (hand, stylus, etc.) through the bristles or between the opposing rows 148 of bristles. While the object is inserted through the opening 142, the bristles 148 conform to the contour of the object to maintain a seal against penetration of ambient light through the opening 142. The bristles 148 return to their resting position once the object is removed, maintaining a light barrier.

In yet another embodiment, the pierceable panel may be formed of a plurality of string beads strung on an elongated elastic string member extending from the closure structure mounting end to the closure structure viewing end. Adjacent strings of the string beads may partially overlap each other to shield light from passing through the pierceable panel. The access opening in the pierceable panel is formed between adjacent strings of the string beads and is pierced by inserting an object (hand, stylus, etc.) between the adjacent strings. The elasticity of the string members allows the opening to expand upon piercing by the object while also allowing the opening to conform to the contour of the object to maintain a seal against penetration of ambient light through the opening, Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A glare reduction hood for a touchscreen display comprising:
   an elongated, tubular structure including an open mounting end, an opposite, open viewing end, and at least a top panel and a bottom panel extending in a longitudinal direction from said mounting end to said viewing end, said panels forming an endless sidewall;
   said mounting end being mountable on the touchscreen display such that the hood projects outwardly from the touchscreen display;
   said bottom panel including an opaque overlapping membrane formed by two overlapping pieces of elastic material that define a transverse access opening that is generally perpendicular to said longitudinal direction and intermediate said mounting end and said viewing end;
   wherein said closure structure shields the touchscreen display, said access opening is pierceable by a piercing object to move said access opening from a rest position to a conforming, sealing disposition when the piercing object is inserted between said pieces of elastic material such that said pieces of elastic material conform to and intimately fit around the piercing object to seal said access opening around the piercing object and to cling to the piercing object as the piercing object is moved, the touchscreen display is viewable through said viewing end, and the entire touchscreen display is contactable by the piercing object via said access opening while said access opening continuously shields the touchscreen display from glare.

2. The glare reduction hood of claim 1, wherein said access opening is linear.

3. The glare reduction hood of claim 1, wherein said two overlapping pieces of elastic material define said bottom panel.

4. The glare reduction hood of claim 1, wherein said access opening is disposed within a boundary of said bottom panel.

5. The glare reduction hood of claim 1, wherein said access opening extends across the entire bottom panel.

* * * * *